(12) United States Patent
Gmirya

(10) Patent No.: US 7,918,146 B2
(45) Date of Patent: Apr. 5, 2011

(54) MULTI-PATH ROTARY WING AIRCRAFT GEARBOX

(75) Inventor: Yuriy Gmirya, Woodbridge, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 366 days.

(21) Appl. No.: 12/295,737

(22) PCT Filed: Apr. 4, 2006

(86) PCT No.: PCT/US2006/012392
§ 371 (c)(1),
(2), (4) Date: Oct. 2, 2008

(87) PCT Pub. No.: WO2007/114817
PCT Pub. Date: Oct. 11, 2007

(65) Prior Publication Data
US 2009/0277299 A1 Nov. 12, 2009

(51) Int. Cl.
*F16H 37/06* (2006.01)
(52) U.S. Cl. .................................. 74/665 C
(58) Field of Classification Search ............ 74/665 A, 74/665 C
See application file for complete search history.

(56) References Cited

U.S. PATENT DOCUMENTS

| | | |
|---|---|---|
| 2,823,558 A | 2/1958 | Semar et al. |
| 3,456,520 A | 7/1969 | Fritsch |
| 3,678,775 A | 7/1972 | Danielsson |
| 4,479,619 A | 10/1984 | Saunders et al. |
| 4,489,625 A | 12/1984 | White |
| 4,783,023 A * | 11/1988 | Jupe .................... 244/6 |
| 4,811,627 A * | 3/1989 | Mouille ............. 74/665 L |
| 4,912,999 A | 4/1990 | Franks et al. |
| 4,928,490 A | 5/1990 | Papastavros |
| 4,973,221 A | 11/1990 | Anderson et al. |
| 5,085,315 A | 2/1992 | Sambell |
| 5,113,713 A | 5/1992 | Isabelle et al. |
| 5,813,292 A | 9/1998 | Kish et al. |
| 5,820,345 A | 10/1998 | Giffin, III et al. |
| 6,035,956 A | 3/2000 | Maurer et al. |
| 6,364,611 B1 | 4/2002 | Matsuda et al. |
| 6,746,356 B2 | 6/2004 | Pengilly |
| 6,883,750 B2 | 4/2005 | Gmirya |

OTHER PUBLICATIONS

PCT International Search Report and written opinion mailed Nov. 22, 2006.

* cited by examiner

*Primary Examiner* — Dirk Wright
(74) *Attorney, Agent, or Firm* — Carlson Gaskey & Olds PC

(57) ABSTRACT

A multi-path split torque gearbox system provides a multiple of three stage torque split power gear trains modules that each transmits torque from a high-speed engine to a main rotor shaft (36). The first stage bevel gear arrangement (30,32) provides a compact packaging arrangement that facilitates various engine mounting locations in all axes. At the second stage, quill shaft assemblies (40) provide equal load balance. At the third stage, each quill shaft assembly includes a multiple of pinion gears (48) in meshing engagement with the final output gear (28). Each torque split modules transfer the power from the high speed input shaft into a multiple of meshing engagements with the final output gear to provide significant torque transfer desired in a single rotor heavy lift rotary wing aircraft embodiment within a compact housing package.

8 Claims, 8 Drawing Sheets

MULTI-PATH ROTARY WING AIRCRAFT GEARBOX

STATEMENT REGARDING FEDERALLY SPONSORED RESEARCH OR DEVELOPMENT

This invention was made with government support with the United States Navy under Contract No.: N00019-06-C-0081. The government therefore has certain rights in this invention.

BACKGROUND OF THE INVENTION

The present invention relates to a multi-path gearbox, and more particularly to a multi-path torque split gearbox for an aircraft.

A gearbox system transfers power from a gas turbine engine to a rotor or propeller of an aircraft. A typical system may direct power from several turbine engines to a single rotor or propeller. Since the rotational velocity of the rotor or propeller is significantly lower than the rotational velocity of the gas turbine engine, the gas turbine engine rotational velocity must be reduced by the gearbox system. In reducing the rotational velocity of the gas turbine engine output, torque is increased through a series of intermediate gear stages and shafts, before the final output drive is provided to the rotor or propeller.

One prior art system includes a number of gears arranged for providing split-torque paths. The torque normally carried by a single drive train path is carried by two drive train paths to thereby split the torque of the original drive train path. The combined weight of these two split-torque paths is less than the weight of the original single drive train path. While this prior art split torque system has managed to increase the horsepower-to-weight ratio in some situations, especially where total horsepower involved is substantial and where multiple input drive paths from different engines are present, this conventional approach still requires a relatively large volume system of relatively significant weight.

Many conventional and split-torque gearbox systems are somewhat heavy and voluminous due to unequal load sharing. Unequal load sharing results when the gearbox system does not consistently split the load. This requires each gear to be sized larger than optimal so as to assure adequate load capability even when the load may not be consistently split.

Furthermore, although effective, typical split torque gearbox systems are usually designed for a single aircraft platform due to the relatively large volume necessarily inherent in these conventional designs. Each aircraft platform must be designed to accommodate particular engine positions associated with the particular gearbox system.

Accordingly, it is desirable to provide a multi-path torque split gearbox system that is relatively uncomplicated and inexpensive to manufacture, has a reduced weight and packaging size, assures an even split of loads, includes independent redundant load paths, yet provides inherent adaptability to various aircraft platforms.

SUMMARY OF THE INVENTION

The multi-path torque split gearbox system according to the present invention provides a multitude of multi-path, three stage power gear train modules that each transmit torque from a high-speed engine to a common main rotor shaft. Within each torque split gear module, the first stage includes a spiral bevel gear mesh; the second stage includes a spur gear mesh; and the third stage includes a double helical gear mesh.

Each split torque module is driven by a high-speed input shaft from a gas turbine engine. At the first stage, the input shaft rotates about an input shaft axis of rotation and mounts a bevel pinion gear that engages a bevel face gear at a first bevel gear mesh. The bevel face gear is mounted to a first stage shaft which rotates about the axis of rotation. The first stage shaft is located above and at least partially within the perimeter of a final output gear to provide a compact packaging arrangement.

This high speed input arrangement advantageously permits various engine mounting locations in all axes. That is, the frustro-conical mesh angle of the bevel gear mesh need only be changed to vary the vertical or Z-axis engine mounting location relative the gearbox system. The bevel gear mesh may also be located at any azimuth position on the bevel face gear to accommodate various engine positions in the X and Y axes relative the gearbox system.

At the second stage, a multitude of quill shaft assemblies are mounted for rotation about respective axes adjacent the perimeter of the final stage output gear. Such an arrangement permits each quill shaft assembly to be mounted in a single common plane such as is readily provided by a relatively flat gearbox housing. The quill shaft assemblies rotate at an equivalent speed and include a quill shaft that is torsionally flexible and angularly compliant to provide the required gear timing for gearbox assembly yet maintain a proper load distribution during gearbox operation. The quill shaft assemblies, as part of the second stage of reduction, provide equal load balance between all gears engaged in the power train.

At the third stage, each quill shaft assembly includes a first and second helical spur gear in meshing engagement with the final output gear. Each torque split module thereby transfers the power from the single high speed input shaft into a multiple of meshing engagements with the final output gear to provide significant torque transfer typically desired in a heavy lift rotary wing aircraft embodiment within a relatively flat gearbox system to provide multiple load paths in which the failure of a single module will not fail the entire system.

The present invention therefore provides a split torque multi-path gearbox system that is relatively uncomplicated and inexpensive to manufacture, has a reduced weight and packaging size, assures an even split of loads, includes independent redundant load paths, yet provides inherent adaptability to various aircraft platforms.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
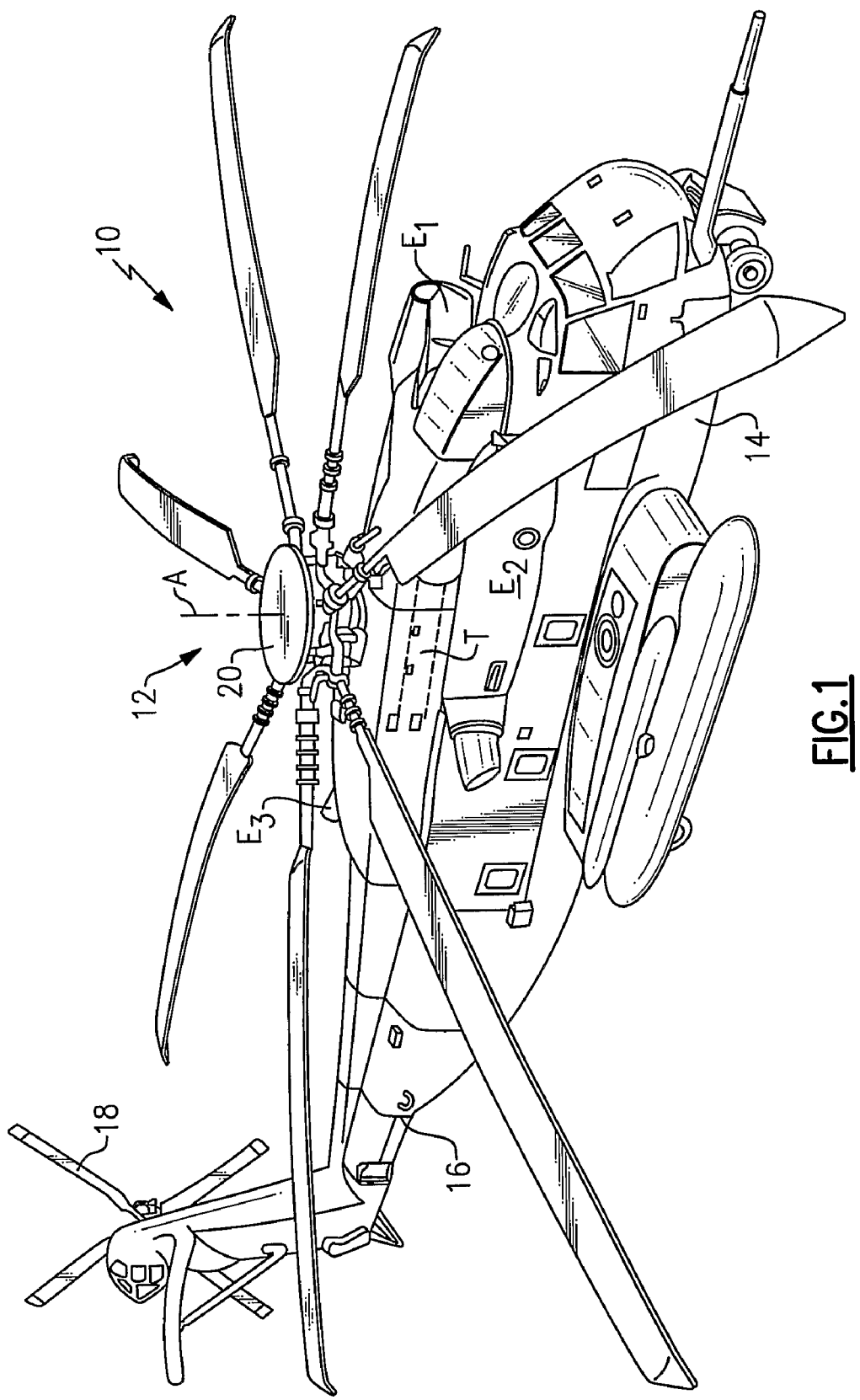
FIG. 1 is a general perspective view an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque rotor 18. The main rotor assembly 12 is driven about a rotor axis of rotation A through a gearbox system 20 by one or more engines E. It should be understood that a Sikorsky CH-53 type helicopter configuration as illustrated in the disclosed embodiment is for discussion purposes only and other aircraft will also benefit from the present invention.

Figure 2:
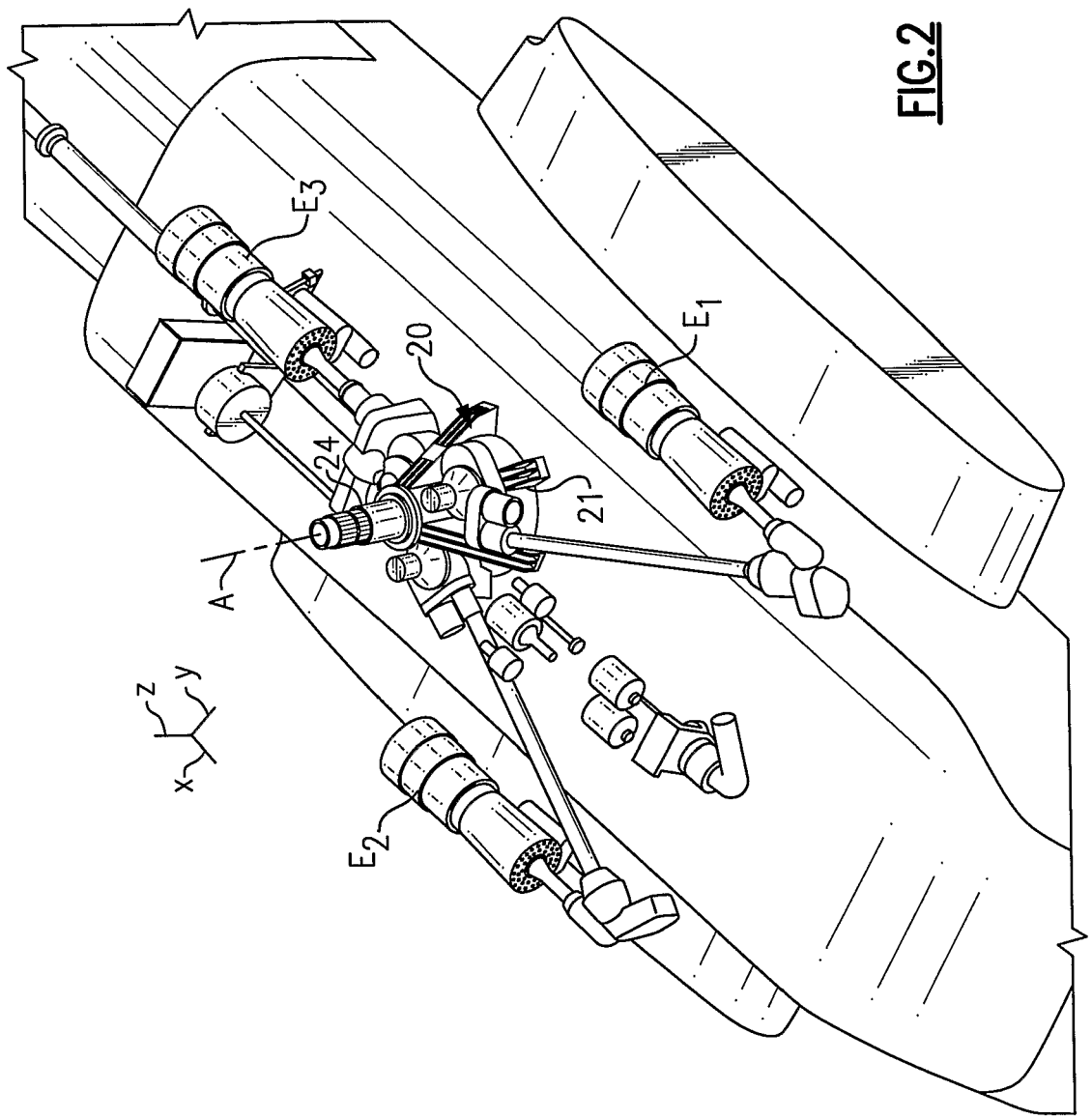
FIG. 2 is a partial phantom view of the exemplary rotary wing aircraft embodiment illustrating the powertrain therefor.

Referring to FIG. 2, the gearbox system 20 is a split torque, three stage power gear train that transmits torque from a multitude of high-speed engines E to a main rotor shaft 24 of the main rotor assembly 12. The gearbox system 20 is preferably mounted within a housing 21 which supports the geartrain therein as well as a main rotor shaft 24. It should be understood that various support housing and structural arrangements will be usable with the geartrain present invention.

The gearbox system 20 is primarily designed for, but not limited to, a single rotor aircraft powered by three engines typical of heavy lift rotary wing aircraft. It should be understood that any number of engines will be usable with the present invention. The gearbox system 20 readily facilitates incorporation of a multitude of engine into an airframe due to the flexible module design and gear arrangement.

Figure 3:
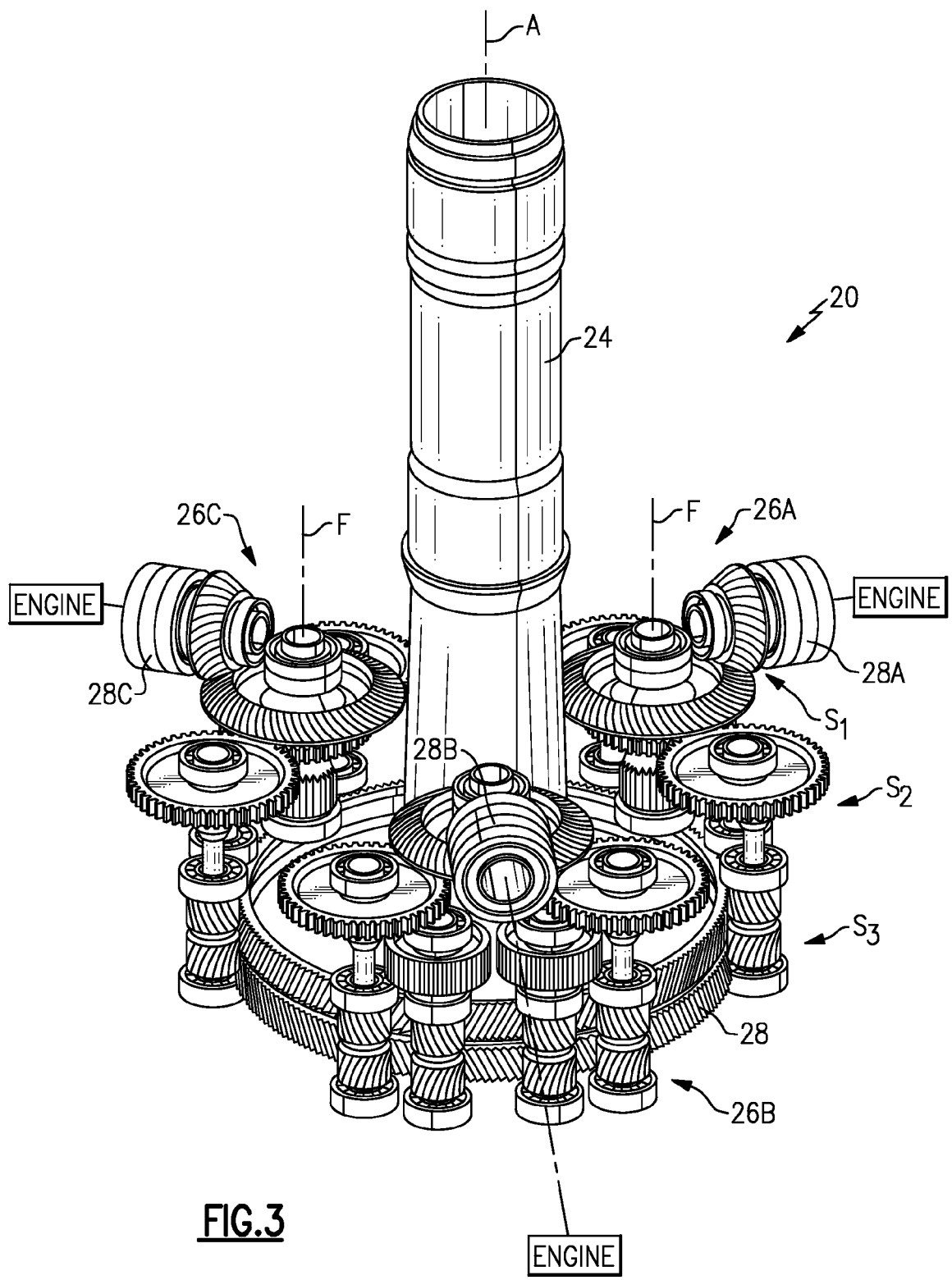
FIG. 3 is a perspective view of a gearbox system according to the present invention.

Referring to FIG. 3, the gearbox system 20 generally includes a multitude of torque split gear modules 26 of which each includes three stages S1, S2 and S3. Each stage includes a plurality of links L1-Ln. Each link represents gears which splits the torque from each engine E (FIG. 2). Each link is preferably structurally designed based on the transmitted portion of the total load for that link. That is, because of the equality of the load split, each link need not be over designed for a greater capacity as was heretofore required to assure transmission of an unequally split load. In the illustrated embodiment, for example only, the three stages provide the following reductions: the first stage—RR1=1.968, input/output—6574/3341 rpm; the second stage—RR2=1.689, input/output—3341/1977 rpm; and the third stage—RR3=11.106, input/output—1977/178 rpm.

Each engine E transmits torque to a respective torque split gear module 26A, 26B, 26C through a respective high speed input shaft 28A, 28B, 28C. The number of the torque split gear modules 26 in the gearbox system 20 depends on aircraft configuration, number of engines and transmitted power. The torque split gear modules 26 are located around a perimeter of a final stage output gear 28 that combines power from each module and transmits the power through the main rotor shaft 24 and into the rotor assembly 12.

Whereas each torque split gear module 26A, 26B, 26C is essentially the same, only torque split gear module 26A will be described in detail, however, it should be understood that the description is equally applicable to torque split gear module 26A, 26B, 26C. That is, although only one module from one engine E will be discussed in detail herein, the gear train from every engine is generally the same and it should be understood that any number of engines may be utilized with the present invention. Within each torque split gear module 26A, 26B, 26C, the first stage S1 preferably includes a spiral bevel gear mesh; the second stage S2 preferably includes a spur gear mesh; and the third stage S3 preferably includes a double helical gear mesh.

Figure 4:
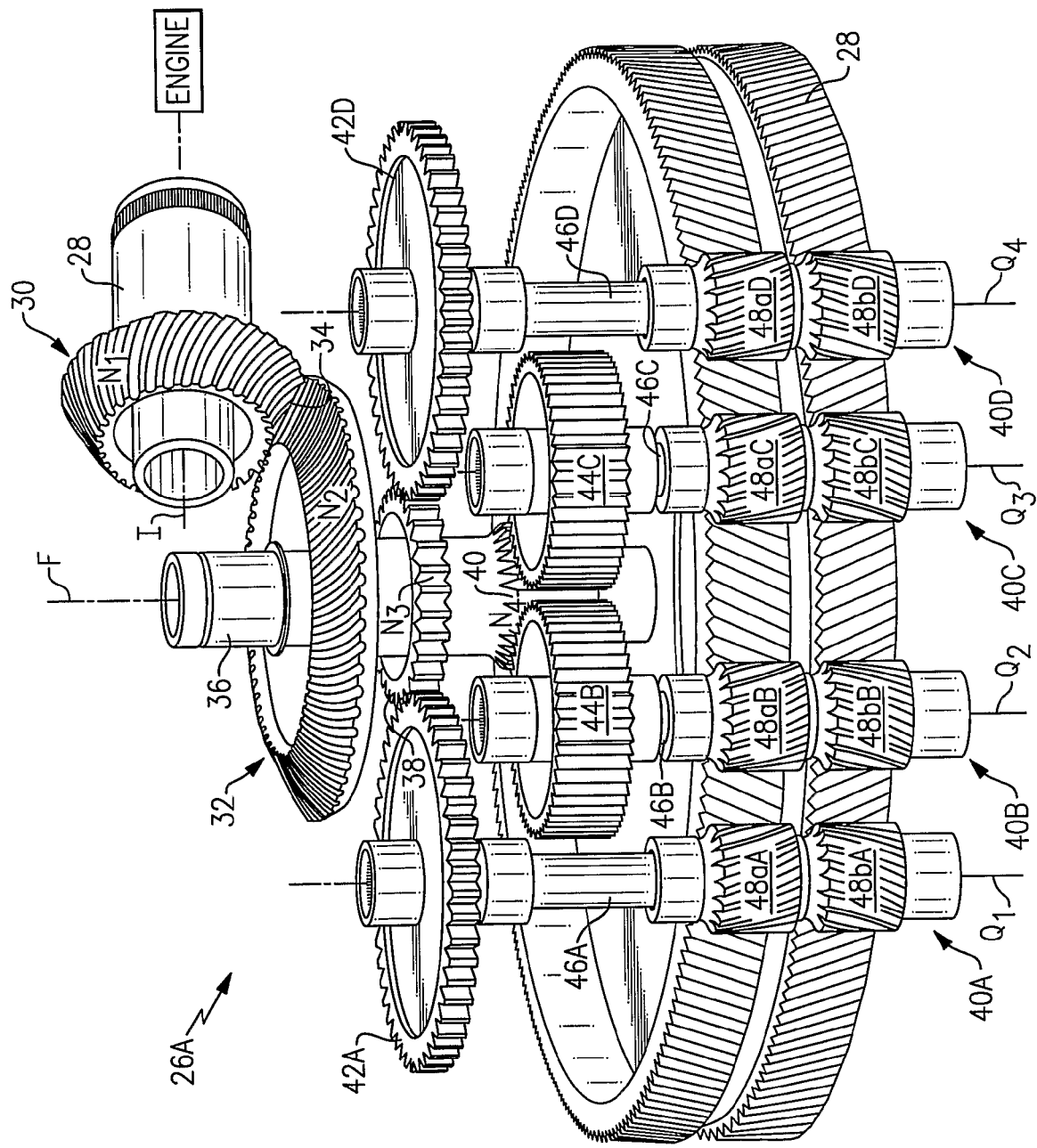
FIG. 4 is a perspective view of the gearbox system of FIG. 3 with an expanded view of a single split torque gearbox module according to the present invention.

Referring to FIG. 4, the torque split gear module 26A is driven by the high speed input shaft 28A. The high speed input shaft 28A rotates about an input shaft axis of rotation I and mounts a bevel pinion gear 30 that engages a bevel face gear 32 at a bevel gear mesh 34. The bevel face gear 32 rotates about a bevel face gear axis of rotation F which is generally parallel to the rotor axis of rotation A (FIG. 3) and transverse to the input shaft axis of rotation I. The bevel gear mesh 34 provides the first stage S1 to translate the input shaft axis of rotation I to the face gear axis of rotation F. It should be understood that other gear teeth arrangements such as the preferred spiral bevel gear arrangement will also benefit from the present invention.

This high speed input arrangement advantageously permits various engine mounting locations in all axes. That is, the conical mesh angle of the bevel gear mesh need only be changed to vary the vertical or Z-axes engine mounting location relative the gearbox system 20 (FIG. 3). The bevel gear mesh 34 may also be located at any azimuth position on the bevel face gear 32 to accommodate various engine mounting positions in the X and Y axes relative the gearbox system 20. Such a first stage input readily facilitates multi-engine rotorcraft in which the engines may be located at various positions of the fuselage.

Figure 5:
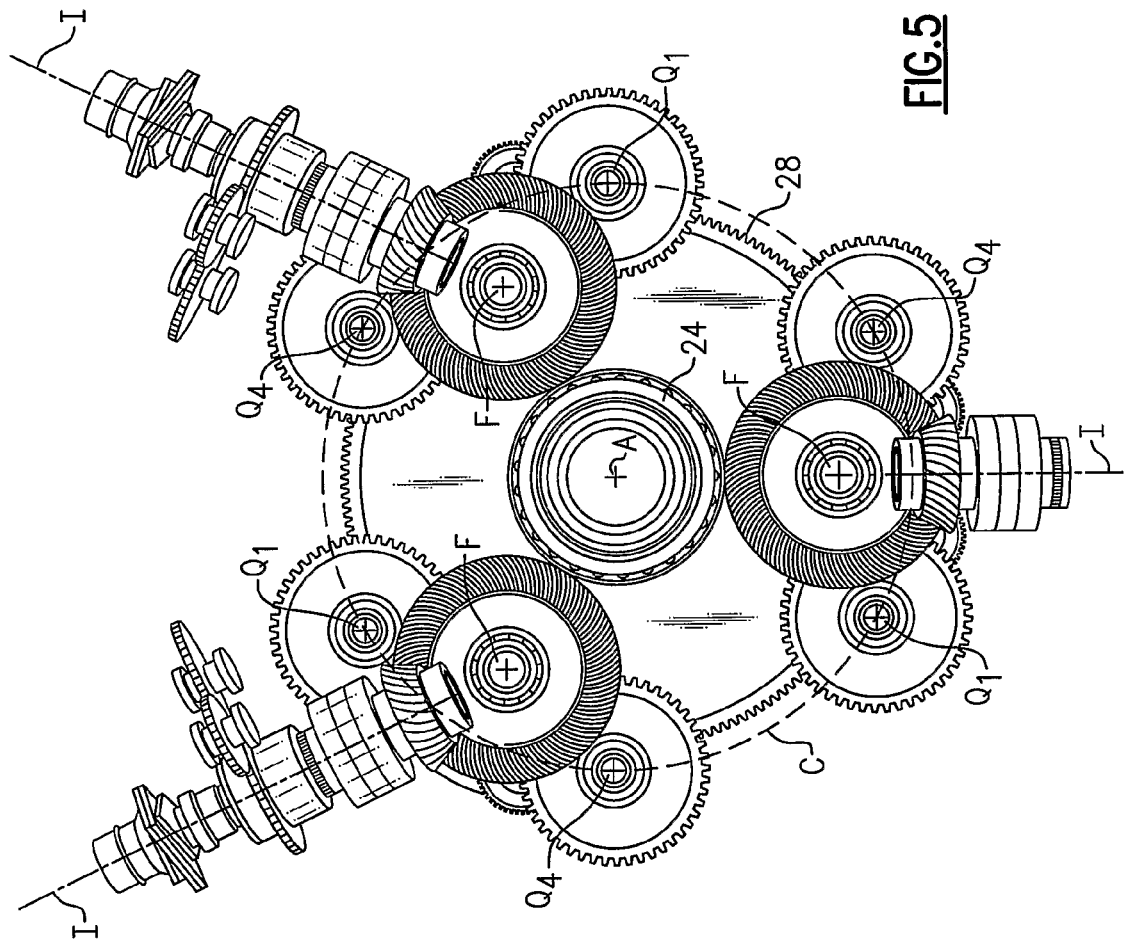
FIG. 5 is a top view of the gearbox system according to the present invention.

The bevel face gear 32 is mounted to a first stage face gear shaft 36 which rotates about the axis of rotation F. The first stage shaft 36 supports a first spur gear 38 and a second spur gear 40 along the length thereof. The first stage shaft 36 is preferably located above and at least partially within the perimeter of the final stage output gear 28 which provides a compact packaging arrangement. That is, the axis of rotation F is located at a radius less than the radius defined by the final stage output gear 28 relative the rotor axis of rotation A (FIG. 5).

At the second stage S2, a first quill shaft assembly 40A, a second quill shaft assembly 40B, a third quill shaft assembly 40C and a fourth quill shaft assembly 40D are mounted for rotation about respective axes Q1-Q4 adjacent the perimeter of the final stage output gear 28. That is, the axes Q1-Q4 are mounted at a common radius C greater than a radius defined by the final stage output gear 28 (FIG. 5). Such an arrangement permits each quill shaft assembly 40A-40D to be mounted in a single common plane P (FIG. 6) such as is readily provided by the gearbox housing 21 (FIG. 2).

Preferably, each of the first quill shaft assembly 40A and the fourth quill shaft assembly 40D include a respective second stage spur gear 42A, 42D which are both meshingly engaged with the first spur gear 38 while the second quill shaft assembly 40B and the third quill shaft assembly 40C include a respective second stage spur gear 44B, 44C which are both meshingly engaged with the second spur gear 40.

The gear interface between the second stage spur gear 42A, 42D and the first spur gear 38 and the second stage spur gear 44B, 44C and the second spur gear 40 have equivalent reduction ratios such that the quill shaft assemblies 40A-40D rotate at an equivalent speed. Second stage spur gears 42A, 42D, are preferably of a greater diameter than second stage spur gears 44B, 44C such that second stage spur gears 44B, 44C may be located below second stage spur gear 42A, 42D to further facilitate the compact packaging arrangement (FIG. 5). That is, the second stage spur gears 42A, 42D, define an offset overlap with the second stage spur gears 44B, 44C.

Figure 7:
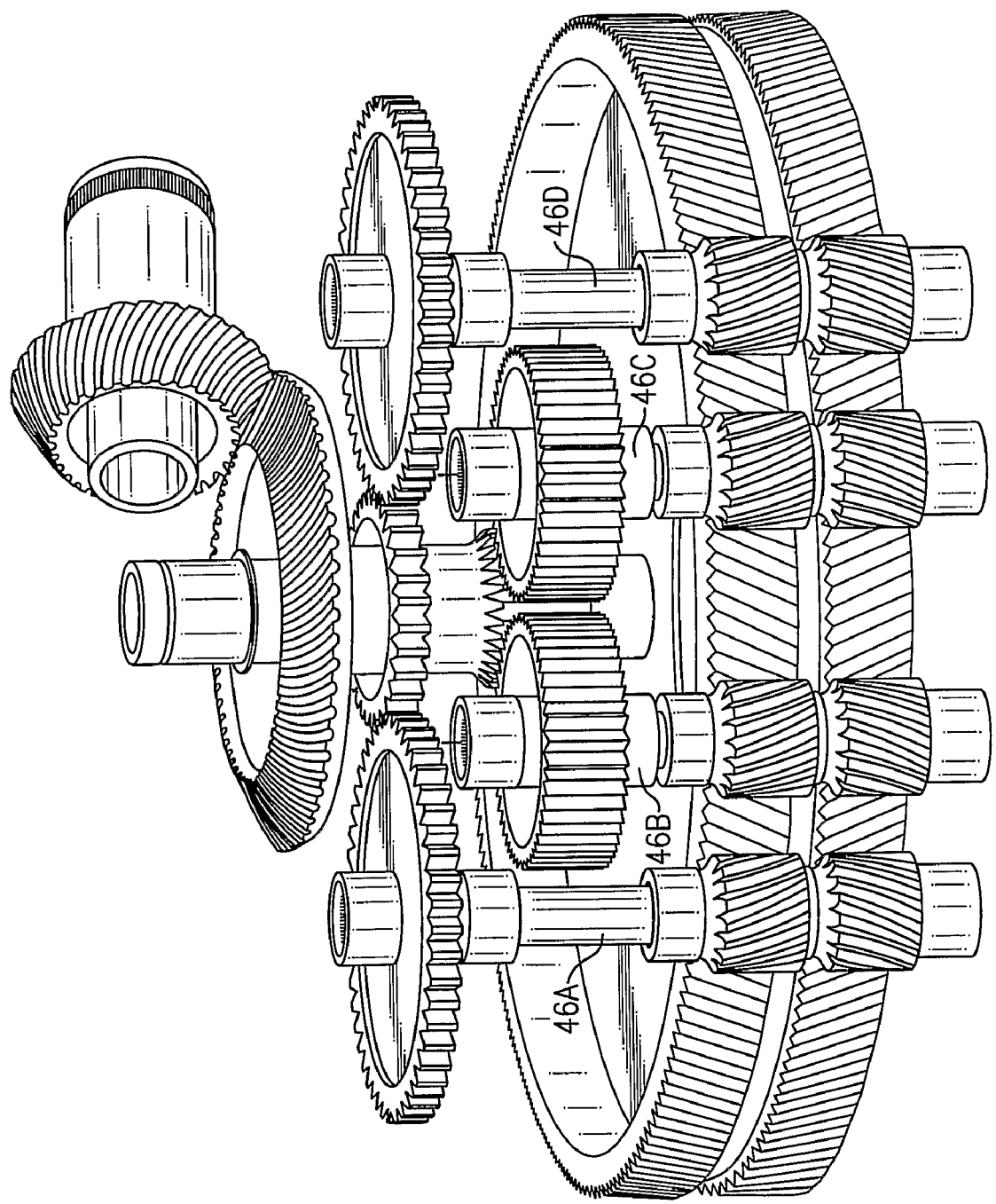
FIG. 7 is a partial phantom view of the single split torque gearbox module of FIG. 4 to illustrate the quill shafts therein.

Each quill shaft assembly 40A-40D include a quill shaft 46A-46D which is a torsionally flexible and angularly compliant member that provides the required gear timing during gearbox assembly, while maintaining a proper load distribution in operation. In order to obtain an equivalent 50/50 torque split between all gears, the quill shafts 46A-46D are of the same torsional properties. Preferably, the quill shafts 46A-46D are identical (FIG. 7) to facilitate assembly and maintenance. The quill shafts 46A-46D, as part of the second stage of reduction, provide equal load balance between all gears engaged in the power train.

At the third stage S3, each quill shaft assembly 40A-40D includes a first helical spur gear 48$a$A-48$a$D and a second helical spur gear 48$b$A-48$b$D which are in meshing engagement with the final stage output gear 28 which is preferably a double helical or "herringbone" gear. Each module thereby transfers the power from the single high speed input shaft 28A into eight (8) meshing engagements with the final stage output gear 28 to provide significant torque transfer typically desired in a heavy lift rotary wing aircraft embodiment to provide a relatively flat gearbox system 20, that provides multiple load paths in which the failure of a single module will not fail the entire system.

Figure 6:
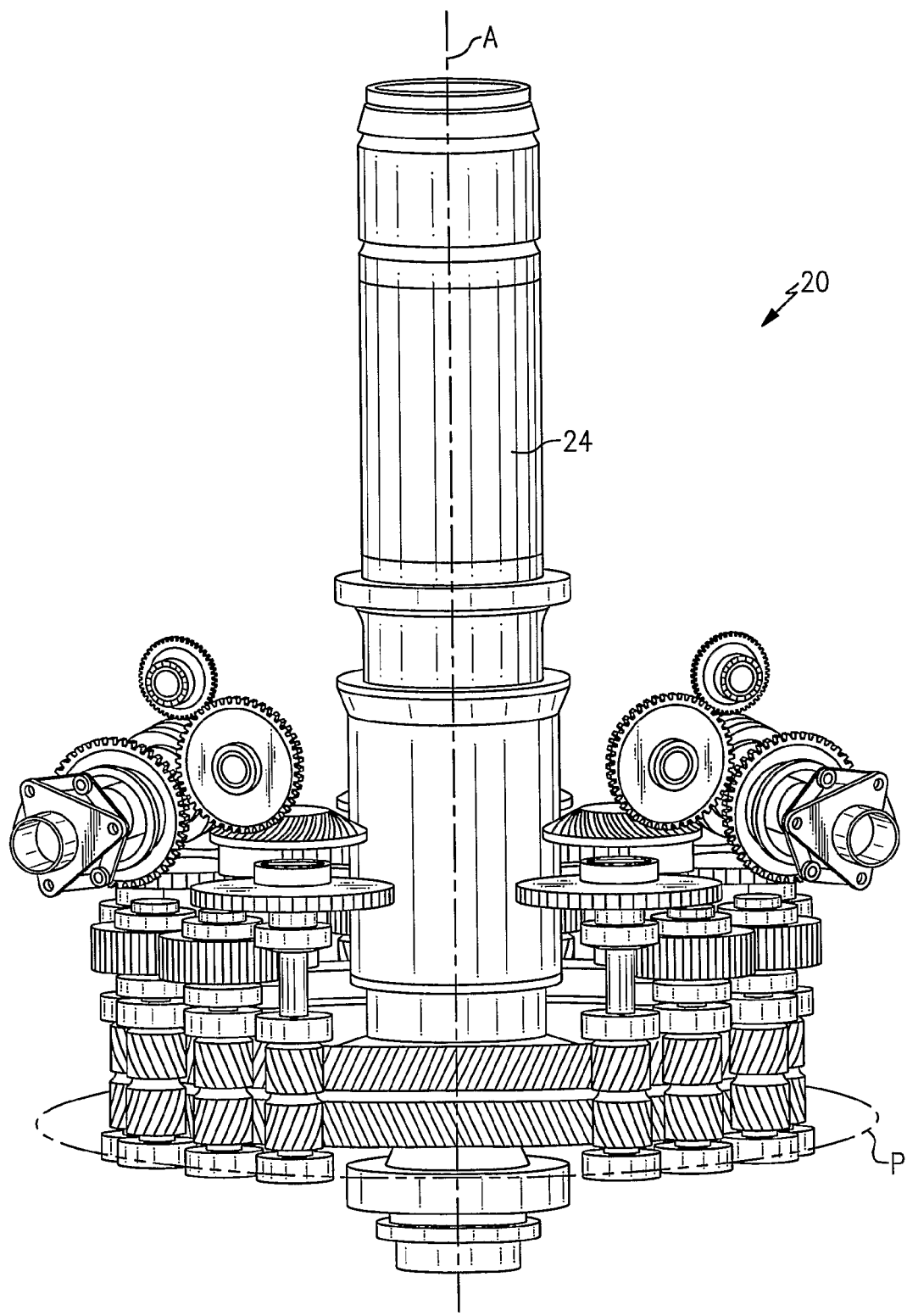
FIG. 6 is an oblique side view of the gearbox system according to the present invention.
Figure 8:
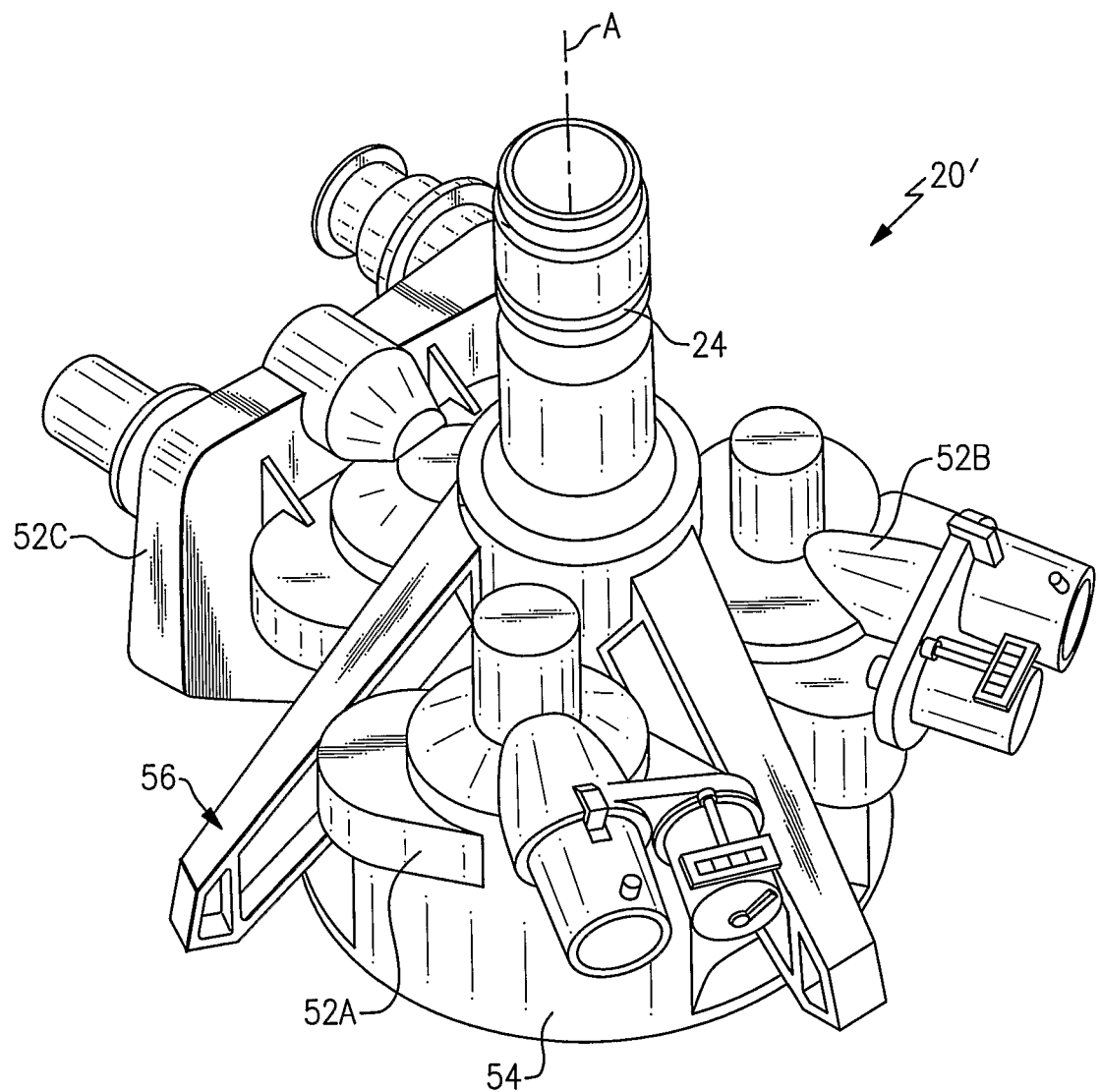
FIG. 8 is a perspective view of a split torque gearbox system with another housing arrangement according to the present invention.

Referring to FIG. 8, another gearbox system 20' includes an alternate housing assembly 50. Since the gear arrangement of the present invention preferably locates the gears on a relatively large diameter about the main output gear (FIG. 5), the gearbox housing assembly 50 may be adapted for usage with various packaging constraints. For example only, the gearbox system 20 may include three independent gear module housings 52A, 52B, 52C mounted to a combined housing 54 which defines the plane P to which the quill shaft assemblies of each module are mounted (FIG. 6). Loads from the main rotor assembly 12 which are transferred through the main rotor shaft 24 are transmitted by a separate rotor shaft support frame assembly 56. The separation of the support minimizes deformation from external loads in the main rotor assembly 12 from being transferred to the gear train. A lighter weight housing assembly which minimizes gear misalignment and increases the life of the system is thereby provided.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gearbox system comprising:
   a final stage output gear which defines a main rotor axis of rotation;
   a bevel face gear mounted to a first stage shaft for rotation about a bevel gear axis of rotation, said bevel gear axis of rotation parallel to said main rotor axis of rotation and located a radial distance from said main rotor axis of rotation less than a radius defined by said final stage output gear;
   a shaft spur gear mounted to said first stage shaft;
   a second shaft spur gear mounted to said first stage shaft;
   a first quill shaft assembly having a second stage spur gear meshed with said shaft spur gear, said first quill shaft assembly mounted for rotation about a first quill shaft axis of rotation;
   a second quill shaft assembly having a second stage spur gear meshed with said shaft spur gear, said second quill shaft assembly mounted for rotation about a second quill shaft axis of rotation;
   a third quill shaft assembly having a second stage spur gear meshed with said second shaft spur gear, said third quill shaft assembly mounted for rotation about a third quill shaft axis of rotation; and
   a fourth quill shaft assembly having a second stage spur gear meshed with said second shaft spur gear, said fourth quill shaft assembly mounted for rotation about a fourth quill shaft axis of rotation, said first, second, third and fourth quill shaft axis of rotation located at common radius greater than said radius defined by said final stage output gear.

2. The gearbox system as recited in claim 1, wherein each of said first, second, third and fourth quill shaft assemblies includes a quill shaft of equivalent torsional properties.

3. The gearbox system as recited in claim 1, wherein each of said first, second, third and fourth quill shaft assemblies are mounted to a common housing plane defined below said final stage output gear opposite a main rotor shaft.

4. The gearbox system as recited in claim 1, wherein said final stage output gear supports a main rotor shaft of a main rotor assembly.

5. The gearbox system as recited in claim 1, wherein said final stage output gear drives a main rotor assembly of a rotary-wing aircraft.

6. The gearbox system as recited in claim 1, further comprising:
   a first helical spur gear and a second helical spur gear mounted to said first quill shaft assembly for rotation therewith;
   a first helical spur gear and a second helical spur gear mounted to said second quill shaft assembly for rotation therewith;
   a first helical spur gear and a second helical spur gear mounted to said third quill shaft assembly for rotation therewith; and
   a first helical spur gear and a second helical spur gear mounted to said forth quill shaft assembly for rotation therewith.

7. The gearbox system as recited in claim 6, wherein said final stage output gear is in meshed engagement with said first helical spur gear and said second helical spur gear mounted to said first quill shaft assembly, said first helical spur gear and said second helical spur gear mounted to said second quill shaft assembly said first helical spur gear and said second helical spur gear mounted to said third quill shaft assembly; and said first helical spur gear and said second helical spur gear mounted to said forth quill shaft assembly.

8. The gearbox system as recited in claim 7, wherein said final output gear is a double helical or "herringbone" gear.

* * * * *